United States Patent
Sagona

(10) Patent No.: US 10,622,897 B2
(45) Date of Patent: Apr. 14, 2020

(54) CONTROLLER FOR BUCK DC/DC CONVERTER WITH EFFECTIVE DECOUPLING

(71) Applicant: Hamilton Sundstrand Corporation, Charlotte, NC (US)

(72) Inventor: John Duward Sagona, Poplar Grove, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/132,887

(22) Filed: Sep. 17, 2018

(65) Prior Publication Data

US 2020/0091821 A1 Mar. 19, 2020

(51) Int. Cl.
*H02M 3/158* (2006.01)
(52) U.S. Cl.
CPC ....... *H02M 3/1582* (2013.01); *H02M 3/1588* (2013.01)
(58) Field of Classification Search
CPC ....... H02M 3/155–158; H02M 3/1582; H02M 3/1588; H02M 1/08; H02M 1/32; H02M 2001/0009; G05F 1/24; G05F 1/34; G05F 1/147; G05F 1/247
USPC .................................. 323/259, 264, 269, 271
See application file for complete search history.

(56) References Cited

U.S. PATENT DOCUMENTS

| | | | |
|---|---|---|---|
| 6,064,187 A | 5/2000 | Redl et al. | |
| 6,181,120 B1 | 1/2001 | Hawkes et al. | |
| 6,424,129 B1 * | 7/2002 | Lethellier | H02M 3/1584 323/272 |
| 6,441,597 B1 * | 8/2002 | Lethellier | H02M 3/158 323/222 |
| 7,772,823 B2 | 8/2010 | Blanken | |
| 7,893,678 B2 | 2/2011 | Blanken | |
| 7,902,803 B2 | 3/2011 | Peng et al. | |

(Continued)

FOREIGN PATENT DOCUMENTS

WO    WO-2005039029    4/2005

OTHER PUBLICATIONS

Extended European Search Report for European Patent Application No. EP19197622.4, dated Feb. 13, 2020.

*Primary Examiner* — Yemane Mehari
(74) *Attorney, Agent, or Firm* — Locke Lord LLP; Scott D. Wofsy; Judy R. Naamat

(57) ABSTRACT

A DC-DC power converter, a control component of a DC-DC power converter, and a method of controlling a buck DC-DC power converter are provided. The method includes receiving at least one of a measured load current and a measured input voltage. The measured load current is a measurement of current that flows from the buck inductor of a physical component of the buck DC-DC power converter. The measured input voltage is a measurement of the DC link input voltage measured across a DC link of the physical component of the buck DC-DC power converter. The method further includes generating a control signal to control a pulse width modulator (PWM), wherein the control signal is based on at least one of the measured load current and the measured input voltage. The PWM is configured to control at least one switch that is coupled to the buck inductor to allow the buck inductor to operate on a current flowing from the DC link only when the at least one switch is turned ON.

20 Claims, 5 Drawing Sheets

(56) References Cited

U.S. PATENT DOCUMENTS

| | | | |
|---|---|---|---|
| 8,723,499 B2 * | 5/2014 | Kiadeh | H02M 3/156 |
| | | | 323/285 |
| 9,154,037 B2 * | 10/2015 | Chen | H02M 3/158 |
| 9,882,488 B2 | 1/2018 | Houston | |
| 9,887,626 B2 * | 2/2018 | Chen | H02M 3/156 |
| 10,084,377 B2 * | 9/2018 | Byun | H02M 3/156 |
| 2008/0106917 A1 * | 5/2008 | Holt | H02M 3/156 |
| | | | 363/26 |

* cited by examiner

CONTROLLER FOR BUCK DC/DC CONVERTER WITH EFFECTIVE DECOUPLING

BACKGROUND OF THE INVENTION

1. Field of the Invention

The present disclosure relates to buck DC-DC converters, and more particularly, to a controller of a buck DC-DC converter that effectively decouples disturbances in a load current or voltage or an input voltage provided by a high voltage DC link from the other of the DC link input voltage and the load current or voltage.

2. Description of Related Art

Buck DC-DC converters are configured to convert a high voltage to a lower voltage. A physical component that steps down the input voltage to a lower average output voltage. This function is implemented with an inductor, capacitor, and one or more switches. The physical component is controlled by a control algorithm that can be implemented by firmware, software executed by a hardware processor, and/or analog discrete components, which can be implemented, for example using a field programmable gate array (FPGA) or software digital signal processor (DSP). In applications, the high voltage input is provided by a DC link that can be subjected to variations, also referred to as disturbances. In addition, when one or more loads are added, removed, or adjusted, a load current or voltage disturbance can occur. The output voltage or DC link input voltage can be affected by disturbances in the respective DC link input voltage and/or load, negatively affecting the power quality of the buck DC-DC converter.

While conventional methods and systems have generally been considered satisfactory for their intended purpose, there is still a need in the art for improved power quality, such as when the buck DC-DC converter is subjected to strict specifications. For example, improved power quality may be needed when the output voltage is applied to sensitive equipment or affects reliability and/or safety of a system, such as an aircraft.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, disclosed is a buck DC-DC power converter. The converter includes a physical component that includes at least one switch connected to a DC link, a buck inductor coupled to the switch that is configured to operate on current flowing from the DC link through the switch when the switch is turned ON, and an output capacitor that is configured to be charged by the buck inductor. The buck inductor is coupled between the DC link and the output capacitor and the output capacitor is coupled in parallel with a load. The converter further includes a control component that is configured to receive at least one of a measured load current that is a measurement of current that flows from the buck inductor and a measured input voltage that is a measurement of the DC link input voltage measured across the DC link. The control component includes a pulse width modulator (PWM) that is configured to be controlled by a control signal to control the at least one switch, the control signal being based on at least one of the measured load current and the measured DC link input voltage.

In embodiments, the control component further includes a peak calculation module that is configured to receive the measured input voltage and a measured output voltage that is measured across the output capacitor. The peak calculation module is further configured to calculate a peak current based on the measured input voltage, the measured output voltage, inductance of the buck inductor, and a switching frequency of the at least one switch.

In embodiments, the control component further includes a first summation point and a second summation point. The first summation point is configured to receive a command voltage and determine a voltage difference between the command voltage and the measured output voltage. The second summation point is configured to receive at least one of an integrated and proportional current of the voltage difference and output an average current which is an average of the at least one of an integrated and proportional current and the measured load current.

In embodiments, the control component further includes a third summation point that is configured to sum the average current and the peak current and output a result of the summation as a third summation output.

In embodiments, the control component further includes a pole-zero cancelation module that is configured to receive the third summation output and output a corresponding system pole to cancel a physical component zero created by ESR resistance associated with the output capacitor.

In embodiments, the control component further includes a comparator that is configured to compare a measured current that flows through the switch when the switch is enabled and the pole-zero output and outputs the control signal.

In embodiments, the physical component further includes a current sensing circuit that is configured to measure the measured load current.

In embodiments, the physical component further includes a voltage sensing circuit that is configured to measure the measured input voltage.

In accordance with further aspects of the disclosure, a control component of a buck DC-DC power converter is disclosed. The control component includes one or more processing blocks configured to receive at least one of a measured load current that is a measurement of current that flows from the buck inductor and a measured input voltage that is a measurement of the DC link input voltage measured across the DC link. The control component includes a pulse width modulator (PWM) that is configured to be controlled by a control signal to control the at least one switch, the control signal being based on at least one of the measured load current and the measured DC link input voltage.

In embodiments, the control component further includes a peak calculation module that is configured to receive the measured input voltage and a measured output voltage that is measured across an output capacitor of the physical component that is charged by the buck inductor. The peak calculation module is configured to calculate a peak current based on the measured input voltage, the measured output voltage, inductance of the buck inductor, and a switching frequency of the at least one switch.

In embodiments, the control component further includes a first summation point and a second summation point. The first summation point is configured to receive a command voltage and determine a voltage difference between the command voltage and the measured output voltage. The second summation point is configured to receive at least one of an integrated and proportional current of the voltage difference and output an average current which is an average of the at least one of an integrated and proportional current and the measured load current.

In embodiments, the control component further includes a third summation point that is configured to sum the average current and the peak current and output a result of the summation as a third summation output.

In embodiments, the control component further comprises a pole-zero cancelation module that is configured to receive the third summation output and output a corresponding system pole to cancel a physical component zero created by ESR resistance associated with the output capacitor of the physical component.

In embodiments, the control component further includes a comparator that is configured to compare a measured current that flows through the switch when the switch is enabled and the pole-zero output and output the control signal.

In accordance with another aspect of the disclosure, a method of controlling a buck DC-DC power converter is disclosed. The method includes receiving at least one of a measured load current and a measured input voltage. The measured load current is a measurement of current that flows from the buck inductor of a physical component of the buck DC-DC power converter. The measured input voltage is a measurement of the DC link input voltage measured across a DC link of the physical component of the buck DC-DC power converter. The method further includes generating a control signal to control a pulse width modulator (PWM), wherein the control signal is based on at least one of the measured load current and the measured input voltage. The PWM is configured to control at least one switch that is coupled to the buck inductor to allow the buck inductor to operate on a current flowing from the DC link only when the at least one switch is turned ON.

In embodiments, the method includes receiving a measured output voltage that is measured across an output capacitor of the physical component that is charged by the buck inductor, and calculating a peak current based on the measured input voltage, the measured output voltage, inductance of the buck inductor, and a switching frequency of the at least one switch.

In embodiments, the method further includes receiving a command voltage, determining a voltage difference between the command voltage and the measured output voltage, determining at least one of an integrated and proportional current of the voltage difference, and determining an average current which is an average of the at least one of an integrated and proportional current and the measured load current.

In embodiments, the method further includes summing the average current and the peak current, and outputting a result of the summing as a third summation output.

In embodiments, the method includes operating on the third summation output to determine a corresponding system pole, cancelling a physical component zero created by ESR resistance associated with the output capacitor of the physical component, comparing a measured current that flows through the switch when the switch is enabled and the pole-zero output, and outputting the control signal based on a result of the comparison.

In embodiments, the method further includes measuring at least one of the measured load current and the measured input voltage.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
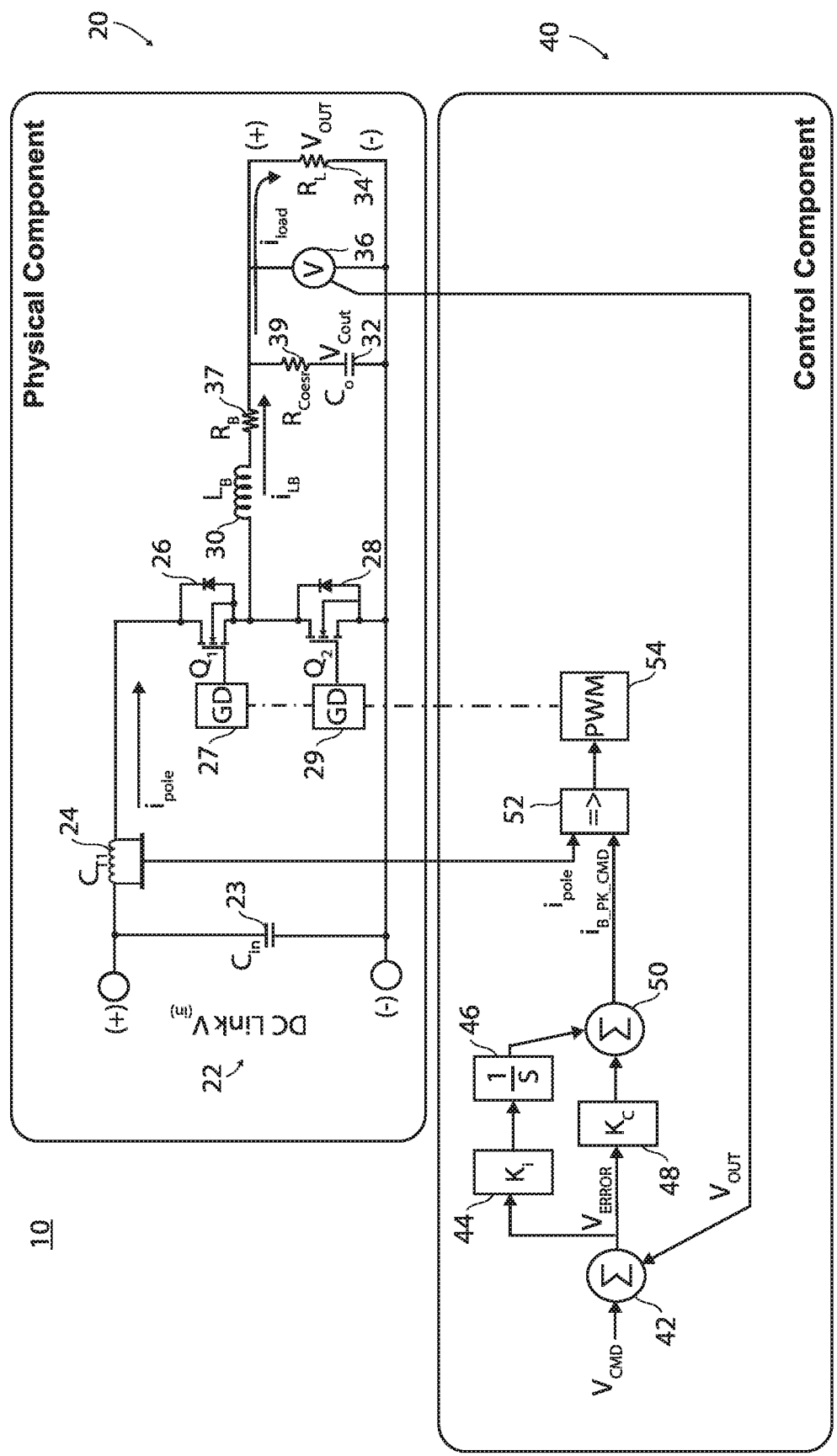
FIG. 1 is a schematic view of an exemplary embodiment of a buck DC-DC converter in accordance with embodiments of the disclosure.

Reference will now be made to the drawings wherein like reference numerals identify similar structural features or aspects of the subject disclosure. For purposes of explanation and illustration, and not limitation, a block diagram of an exemplary embodiment of a buck DC-DC converter in accordance with a first embodiment of the disclosure is shown in FIG. 1 and is designated generally by reference character 10. Converter 10 includes a physical component 20 and a control component 40.

Those skilled in the art will readily appreciate that other configurations of the physical component 20 correspond to different topologies that can be used in a similar way without departing from the scope of this disclosure such as an asynchronous buck converter that uses a diode instead of a second switch.

The physical component 20 includes a DC link input voltage ($V_{in}$) 22, a DC link capacitor 23 (having capacitance $C_{in}$), a current transformer ($C_{T1}$) 24 provided at a first node, a first switch ($Q_1$) 26, a second switch ($Q_2$) 28, a buck inductor 30 (having inductance $L_B$), a first resistance 37 (having resistance $R_B$) that is a buck inductor winding resistance, a first gate drive circuit (GD) 27, a second gate drive circuit (GD) 29, an output capacitor 32 (having capacitance $C_o$), a second resistance 39 (having resistance $R_{coesr}$ that is an equivalent series resistance (ESR) of output capacitor 32), a load 34 (having resistance $R_L$), and a voltage sense circuit 36 provided at a second node at which a measurement of a voltage across the output capacitor 32 is obtained.

A current flowing through the current transformer 24 is denoted as $i_{Pole}$, wherein current transformer 24 measures $i_{Pole}$. A current flowing through the buck inductor 30 is denoted as $i_{LB}$. A load current flowing through the load 34 is denoted as $i_{Load}$. A voltage across the load 34 is denoted as $V_{out}$. A voltage across the output capacitor 32 is denoted as $V_{Cout}$, wherein the voltage sense circuit 36 measures $V_{out}$.

The DC link input voltage 22 is a high voltage input that is the AC output of a power source, permanent magnet generator (PMG), for example, which has been converted to DC voltage. In an example, the DC link input voltage 22 is the output of an aircraft PMG which is physically attached to the engine that has been converted to a DC voltage by a physical AC to DC circuit. The DC link capacitor 23 stabilizes the DC link input voltage 22. The current $i_{Pole}$ is measured at the current transformer 24, such as by using a current transformer to provide isolation. A person skilled in the art will appreciate that other devices can be used to measure the current, for example a sense resistor.

Figure 2:
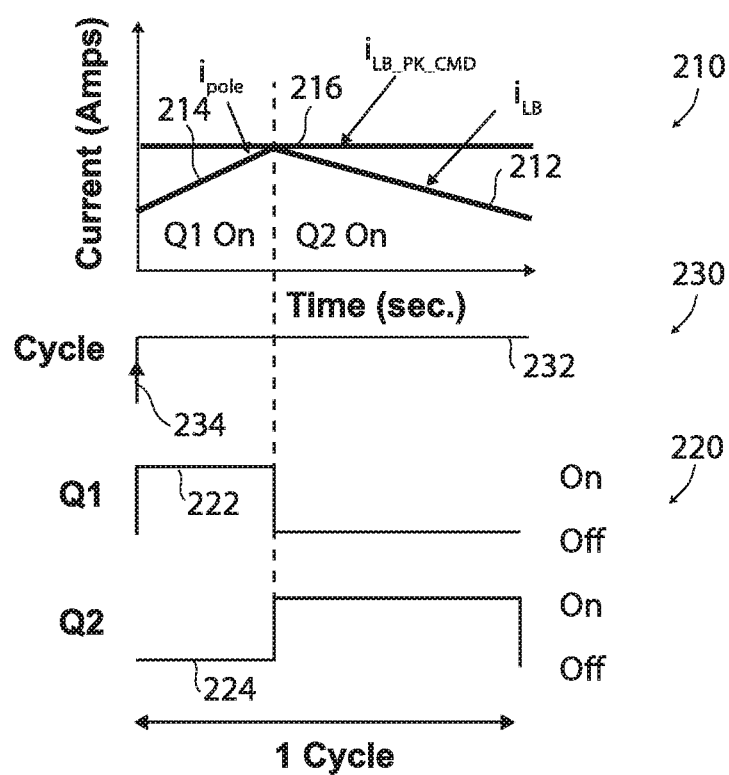
FIG. 2 is a timing diagram of control signals that control operation of a physical component of converter in accordance with embodiments of the disclosure.

In a synchronous buck converter embodiment such as the example buck DC-DC converter 10, the first and second switches 26, 28 are semiconductor switches, such as (but not limited to) MOSFET switches, that are controlled by the control component 40 as shown in FIG. 2 to synchronously control the current that flows to the buck inductor 30. The first and second gate drive circuits 27, 29 switch the first and second switches 26 and 28 between conducting (ON) and blocking (OFF) states as commanded by a logic signal output by the control component 40. The first and second gate drive circuits 27, 29 are operated by the logic signal output by the control component 40 to cause one of the first and second switches 26, 28 to be in an ON state at a time, so that when one of the first and second switches 26, 28 is turned ON, the other of the first and second switches 26, 28 is turned OFF, with one of the first and second switches 26, 28 turned ON throughout a cycle, the duty cycle being the amount of time that the first switch 26 is turned ON.

When the first switch 26 is turned ON, the current through the buck inductor 30 increases (see curve 214 in FIG. 2). This current flows through the first switch 26 to the buck inductor 30 and charges output capacitor 32 as the buck inductor 30 limits the rate of change of the current. A key function of the output capacitor 32 is to serve as an energy storage device that is charge by inductor current $i_{LB}$ and discharged by load current $i_{Load}$. The first resistance 37 is due to the winding resistance of the buck inductor 30. The second resistance 39 is due to the internal resistance (ESR) of output capacitor 32. The voltage sense circuit 36, from which the voltage measurement V across the output load resistor 34 is obtained, is in series with the inductor 30 and in parallel with the output capacitor 32. The voltage sense circuit 36 can include, for example, a standard differential operational amplifier (op-amp) circuit or equivalent. Similarly, the load 34 (shown as a resistor for illustration purposes) is coupled in series with the inductor 30 and in parallel with the output capacitor 32. The load 34 can be coupled in parallel with the voltage sense circuit 36.

When the first switch 26 is turned OFF, current does not flow through the first switch 26. Current flows through a diode of switch 28 until switch 28 is turned on. Current flows through the buck inductor 30 (see curve 212 in FIG. 2) and charges output capacitor 32. This hold true in continuous conduction mode (keeping in mind that current through an inductor does not go to zero).

In an asynchronous embodiment, the second switch 28 can be replaced by a diode (not shown) and the gate drive circuit 29 can be omitted. The control component 40 transmits the logic signal to the first switch 26 only. The first switch 26 is controlled by the control component 40, as shown in FIG. 2, to asynchronously control the current that flows to the inductor 30. The diode is configured to switch based on current of the buck inductor 30 during a duty cycle of the physical component 20 without direct input from the control component 40, for example. When switch 26 is turned on the current increases through the buck inductor (see FIG. 2, curve 214). When switch 26 is turned off then the diode that replaces switch 28 conducts current (see FIG. 2, curve 212) and charges output capacitor 32.

The control component 40 includes logic configured to drive switching of the first and second switches 26 and 28 between a first mode and second mode, as described in greater detail below. The control component 40 provides a first summation point 42, an integral gain 44, an integral function 46, a proportional control term 48 for proportional gain, a second summation point 50, a comparator 52, and a pulse width modulator (PWM) 54.

The first summation point 42 is implemented in software, firmware, or hardware to add an input command voltage $V_{cmd}$ to a reverse of the measured voltage V measured at the voltage sense circuit 36. The input command voltage $V_{cmd}$ is a selectable voltage used to control the output voltage at the load 34 $V_{out}$. In the example shown, the input command voltage $V_{cmd}$ is selected to be 28V in order to control the output voltage $V_{out}$ at the load 34 to be 28V. The first summation point 42 outputs $V_{ERROR}$, wherein $V_{ERROR} = V_{cmd} - V$.

The integral gain 44 and integral function 46 are implemented in software, firmware, or hardware to operate on $V_{ERROR}$ in order to _to cause the command voltage $V_{cmd}$ to be equal to the measured voltage V and the output voltage $V_{out}$. The proportional control term 48 for proportional gain is implemented in software, firmware, or hardware to operate on $V_{ERROR}$ in order to cause the command voltage $V_{cmd}$ to be equal to the measured voltage V and the output voltage $V_{out}$. A first current output by the integral gain 44 and integral function 46 and a second current output by the proportional control term 48 are provided to the second summation point 42 for summing the first and second currents, wherein the second summation point 42 outputs the result as $i_{LB\_PK\_CMD}$.

The comparator 52 is implemented in software, firmware, or hardware to compare $i_{Pole}$ measured at the current transformer 24 to $i_{LB\_PK\_CMD}$ obtained from the second summation point 50 and outputs a high value to the PWM 52 only when $i_{Pole}$ greater than or equal to $i_{LB\_PK\_CMD}$. The PWM 52, which has a block internal clock, is implemented in software, firmware, or hardware to output a logic signal to the gate drive circuits 27 and 29.

The control component 40 can operate to provide an inner current loop and an outer voltage loop. With reference to the inner current loop, it can operate as a peak current mode current controller as now described. As described above, the comparator 52 outputs a high value only when iPole is greater than or equal to $i_{LB\_PK\_CMD}$. The PWM 54 receives the output from the comparator 52 and controls the first and second switches 26 and 28 via the gate drive circuits 27 and 29, with only one of the switches 26 and 28 turned on at a time while the other of the switches 26 and 28 is turned off, as shown in FIG. 2.

With reference to FIGS. 1 and 2, a diagram 200 is shown that shows a graph 210 that shows an $i_{LB}$ curve 212 for $i_{LB}$, an $i_{Pole}$ curve 214 for $i_{Pole}$, and an $i_{LB\_PK\_CMD}$ curve 216 for $i_{LB\_PK\_CMD}$. Diagram 200 further shows a switching diagram 220 synchronized with the graph 210, which includes a Q₁ curve 222 for first switch 26 and a Q₂ curve 224 for second switch 28.

As shown in the switching diagram 220, a cycle can begin at the rising edge 234 of a start cycle curve 232 shown in start cycle graph 230. A clock (not shown) provides the signal for the start cycle curve 232. The duty cycle of the start cycle curve 232 is a function of Vout/$V_{in}$ (wherein $V_{in}$ is the DC link input voltage 22) and also $i_{LB\_PK\_CMD}$. At the beginning of every cycle first switch 26 is turned on until the current $i_{Pole}$ as measured at the current transformer 24 equals the commanded value $i_{LB\_PK\_CMD}$. With the start of the cycle the first switch 26 is turned ON, as indicated by the Q₁ curve 222 at an ON value, and second switch 28 is turned OFF, as indicated by the Q₂ curve 224 at an OFF value. When first switch 26 is ON, $i_{Pole}$ increases. When the comparator 52 detects that $i_{Pole}$ is greater than or equal to $i_{LB\_PK\_CMD}$, the first switch 26 is turned OFF, as indicated by the Q₂ curve 222 at an OFF value, and second switch 28 is turned ON, as indicated by the Q₂ curve 224 at an ON value. When first switch 26 is OFF, $i_{Pole}$ decreases, which causes $i_{Pole}$ decrease, until the cycle begins again. The cycle can be repeated e to continuously at a fixed frequency, which is referred to as a switching frequency of the switches 26 and 28.

With reference to the outer voltage loop, the outer voltage loop is provided as a proportional integral controller. The first summation point 42 determines $V_{ERROR}=V_{cmd}-V$. $V_{ERROR}$ is then routed through a first path via the integral gain 44 and integral function 46 which outputs the first current and a second path via the proportional control term 48 which outputs the second current. The second summation point 50 adds the first and second currents and outputs $i_{LB\_PK\_CMD}$.

Accordingly, the control component 20 operates in a first mode in which the first switch 26 is turned on until iPole reaches a level of $i_{LB\_PK\_CMD}$, at which point the first and second switches 26 and 28 operate in a second mode, in which the first switch 26 is turned off and second switch 28 is turned on until the a cycle is restarted as indicated by the cycle pulse 232.

While specific topologies of the physical component 20 and control component 40 are illustrated in the example of FIG. 1, one of skill in the art, having the benefit of this disclosure, will understand that alternate topologies that may use different circuit or operative components could similarly be utilized. One of skill in the art, having the benefit of this disclosure will further understand that specific inductance, capacitances, resistances, voltages, and the like, of respective circuit components in the physical component 20 can be adjusted or modified to achieve desired results.

Figure 3:
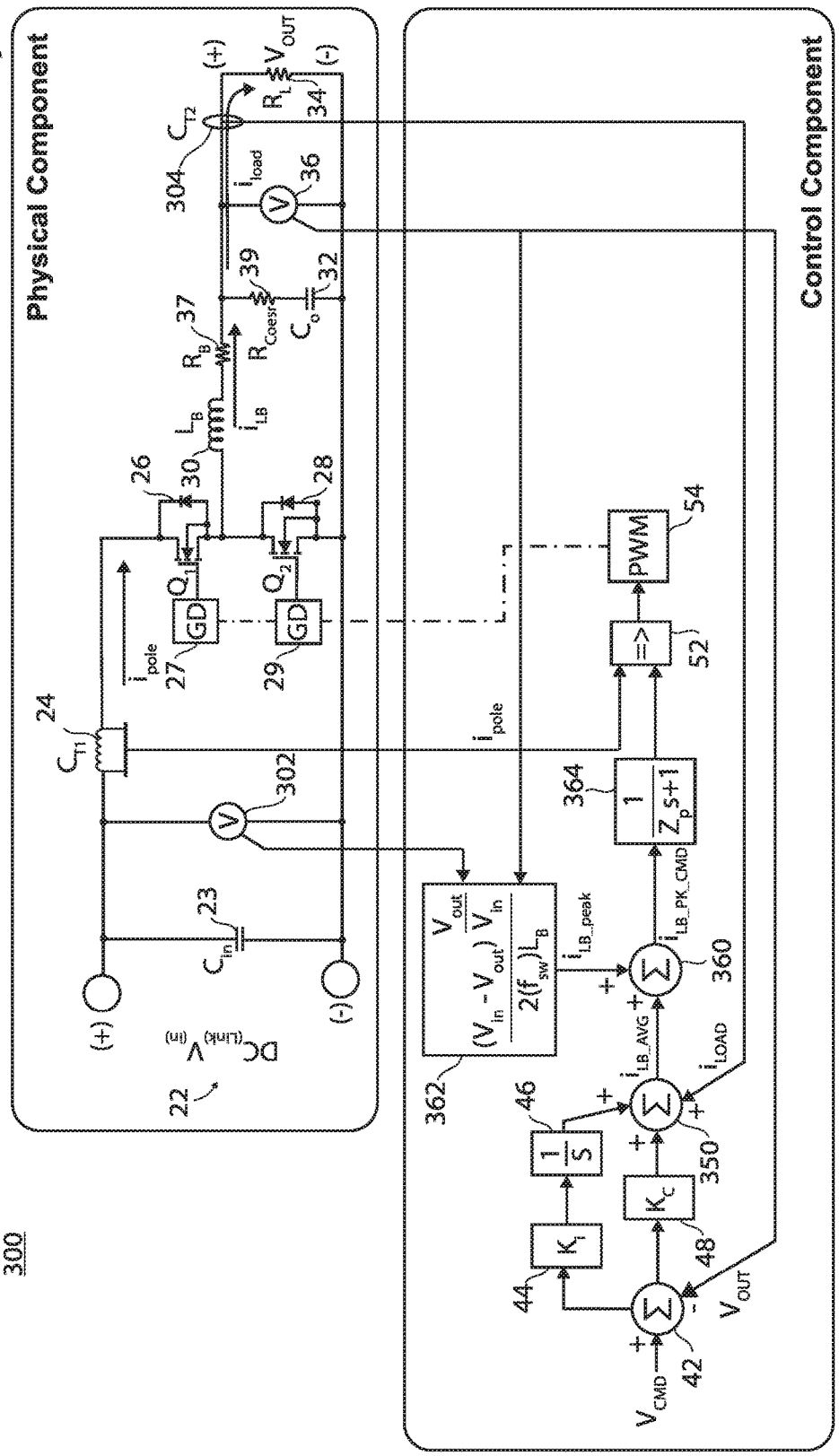
FIG. 3 is a schematic view of an exemplary embodiment of a synchronous buck DC-DC converter in accordance with embodiments of the disclosure.

For purposes of explanation and illustration, and not limitation, a block diagram of an exemplary embodiment of a buck DC-DC converter in accordance with a second embodiment of the disclosure is shown in FIG. 3 and is designated generally by reference character 300.

Methods associated with operation of the converter 300 in accordance with the disclosure, or aspects thereof, are provided in FIGS. 3-5, as will be described. The systems and methods described herein can be used to provide improved dynamic stiffness.

Converter 300 is configured to include the physical component 20 as described with respect to converter 10 shown in FIG. 1, and a control component 340 that improves dynamic stiffness of the converter 100 relative to the dynamic stiffness of converter 10. The physical component 20 includes the same elements as those shown in the physical component 20 of converter 10 shown in FIG. 1, whereas the elements can have the same or similar structures and functions as described with respect to FIG. 1. In addition, physical component 20 shown in FIG. 3 includes a voltage sense circuit 302 provided at a third node of the physical component 20 at which a voltage measurement V of the input voltage from the DC link is obtained. The voltage sense circuit 302 is provided in parallel to the DC link capacitor 23 and the DC link input voltage $V_{in}$ 22 to measure a voltage through the DC link capacitor 23. The voltage sense circuit 302 can be implemented, for example, by a differential op-amp.

A current sense device 304 is provided at a fourth node in series with the load 34. The load current $i_{Load}$ is measured by the current sense device 304, wherein an example current source device a hall-effect component, without limitation to a particular component.

The control component 340 includes the first summation point 42, the integral gain 44, the integral function 46, the proportional control term 48, the comparator 52 and the PWM 54, as shown and described with respect to the control component 40 shown in FIG. 1. In addition, the control component 340 includes a second summation point 350, a third summation point 360, a peak calculation module 362, and a system pole-zero cancellation module 364.

As described with respect to FIG. 1, the first summation point 42 adds $V_{cmd}$ to a reverse of the measured voltage V and outputs $V_{ERROR}$, wherein $V_{ERROR}=V_{cmd}-V$. The integral gain 44, integral function 46, and proportional control term 48 operate on $V_{ERROR}$. An output first current of the integral gain 44 and integral function 46 and an output second current of the proportional control term 48 are provided to the second summation point 350. The current measurement for $i_{LOAD}$ obtained by the current sense device 304 is an average current that is also provided to the second summation point 350. The second summation point 350 sums the first current, the second current, and $i_{Load}$ and outputs an inductor current command $i_{LB\_AVG}$. The peak calculation module 362 receives the measured voltages obtained at the voltage sense circuit 36 and the voltage sense circuit 302, respectively, and outputs $i_{LB\_PEAK}$ as the peak current component of $i_{LB}$ based on the formula $i_{LB}=$ $$\frac{(V_{in}-V_{out}) \cdot \frac{V_{out}}{V_{in}}}{2 \cdot f_{sw} \cdot L_B}$$

The third summation point 360 receives and sums $i_{LB\_AVG}$ and $i_{LB\_PEAK}$ and outputs the result of the summation as $i_{LB\_PK\_CMD}$, which is then provided to the pole-zero cancellation module 364. The pole-zero cancellation module 364 operates on $i_{LB\_PK\_CMD}$ to form a pole ($Z_p$s+1) that cancels the zero of the physical component 20 that is formed by the second resistance 39 (which is the ESR of output capacitor 32), wherein $Z_p$ is defined as ($R_{coesr} \times C_o$). The system pole-zero cancellation module 364 then provides its output to the comparator 52.

The comparator 52 and PWM 54 can be structured and function the same way as shown and described with respect to FIG. 1. The comparator 52 compares the output from the pole-zero cancellation module 364 to $i_{Pole}$ as measured at the current transformer 24. The comparator 52 outputs a high value only when is greater than or equal to the output from the e is system pole-zero cancellation module 364. The PWM 54 receives the output from the comparator 52 and controls the first and second switches 26 and 28 via the gate drive circuits 27 and 29, with only one of the switches 26 and 28 turned on at a time while the other of the switches 26 and 28 is turned off.

The control component 340 can operate to provide two loops, referred to as an inner current loop, and an outer voltage loop. In the inner current loop, the third summation point 360 receives $i_{LB\_AVG}$ and $i_{LB\_PEAK}$ and outputs $i_{LS\_PK\_CMD}$, which is then provided to the pole-zero cancellation-module 364, which operates on $i_{LB\_PK\_CMD}$ and provides its output to the comparator 52, which controls the PWM 54 for outputting logic signals to the gain devices 27, 29. In the outer voltage loop, the second summation point 350 sums the first current, the second current, and iLoad and outputs an average current signal $i_{LB\_AVG}$, which is the average of the first current, the second current, and iLoad. Furthermore, in the outer voltage loop, the first summation point 42 determines $V_{ERROR}=V_{cmd}-V$.

Figure 3B:
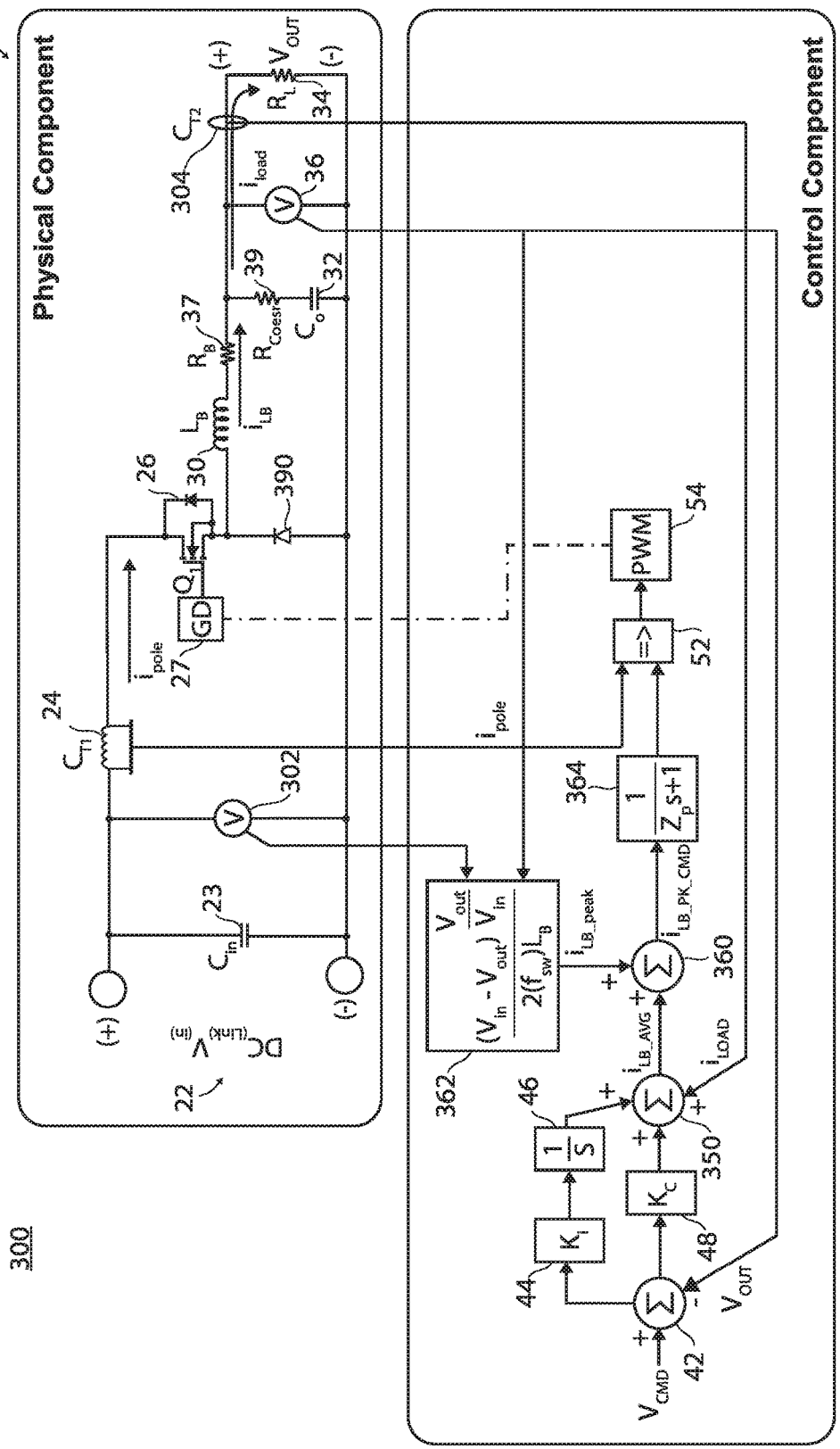
FIG. 3B is a schematic view of an exemplary embodiment of an asynchronous buck DC-DC converter in accordance with embodiments of the disclosure.

In an asynchronous embodiment shown in FIG. 3B, the second switch 28 can be replaced by a diode 390. In the asynchronous embodiment, the ground driver 29 may be no longer used, and a signal to turn the second switch 28 on or off is no longer used.

The first switch 26 is controlled by the control component 340, to asynchronously control the current that flows to the buck inductor 30. The diode 390 is configured to switch based on voltage during a duty cycle of the physical component 20 without direct input from the control component 340, for example. Accordingly, with additional reference to FIG. 2, the control component 20 operates in a first mode in which the first switch 26 is turned on until $i_{Pole}$ reaches a level of [$i_{LB\_PK\_CMD}$], wherein pole-zero cancellation module 364 cancels the physical component zero that is formed by the second resistance 39 of output capacitor 30. When $i_{Pole}$ reaches this level, the first and second switches 26 and 28 operate (or the first switch 26 and diode 390 in the asynchronous mode) in a second mode. When operating in the second mode, the first switch 26 is turned off and the second switch 28 (or diode 390 in the asynchronous mode) is turned on until the cycle is restarted as indicated by the cycle pulse 232.

Figure 4:
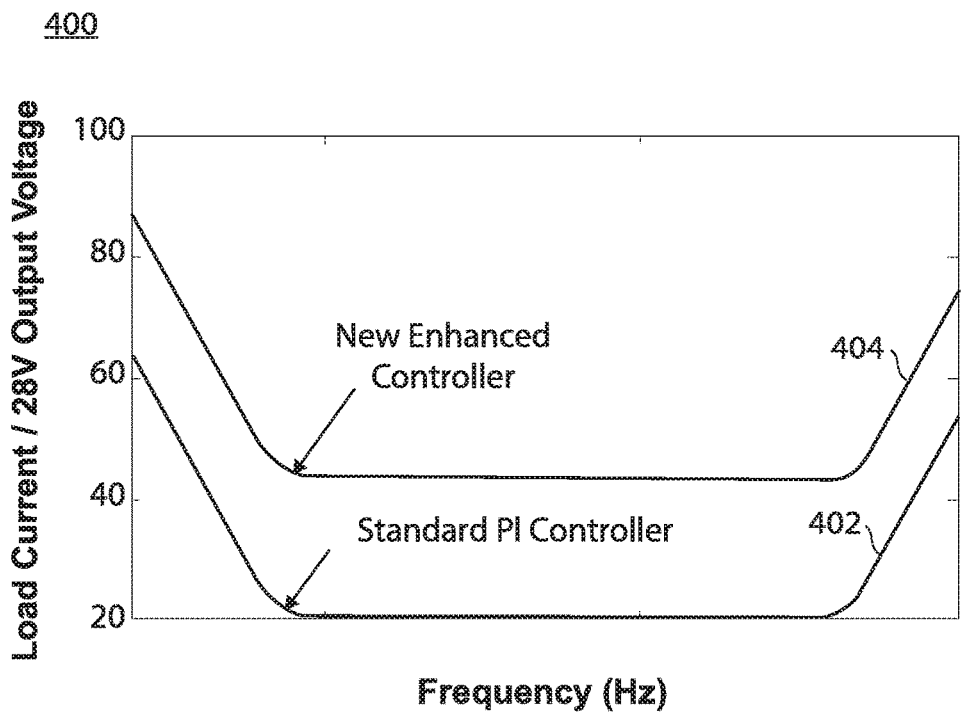
FIG. 4 is a graph of overall dynamic stiffness of the converters shown in FIG. 1 and FIG. 3.

With reference to FIG. 4, a graph 400 of overall output dynamic stiffness is shown. Dynamic stiffness refers to the output load current ($i_{Load}$) that is required to produce a per unit error in output voltage $V_{out}$. A first curve 402 is shown that corresponds to the overall output dynamic stiffness of the converter 10 shown in FIG. 1 over a range of frequencies. A second curve 404 is shown that corresponds to the overall output dynamic stiffness of the converter 100 shown in FIG. 3 over the range of frequencies. The second curve 404 is higher across all frequencies, particularly in a mid-range of frequencies. At the midrange of frequencies, the respective first curve 402 and second curve 404 stiffness is approximately 20 and 44 amps/volt.

The measurement of output current $i_{Load}$ by the current sense device 304 allows direct load disturbance information to be added to the second summation point 350 to increase the overall dynamic output stiffness of the converter 300. In conjunction with the current sense device 304, the pole-zero cancellation module 364 is also needed to cancel the physical component pole of the system due to the second resistance 39 (the ESR of output capacitor 32). Peak calculation module 362 provides two main functions: The first function is to provide input voltage disturbance rejection to minimize the effect of disturbances of the input voltage $V_{in}$, on the output voltage $V_{out}$ or load current $I_{Load}$. The second function is to provide control of the current state, which can be the average current that flows into the output capacitor 32.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a," "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of the disclosure include software algorithms, programs, or code that can reside on a computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the logic, equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Figure 5:
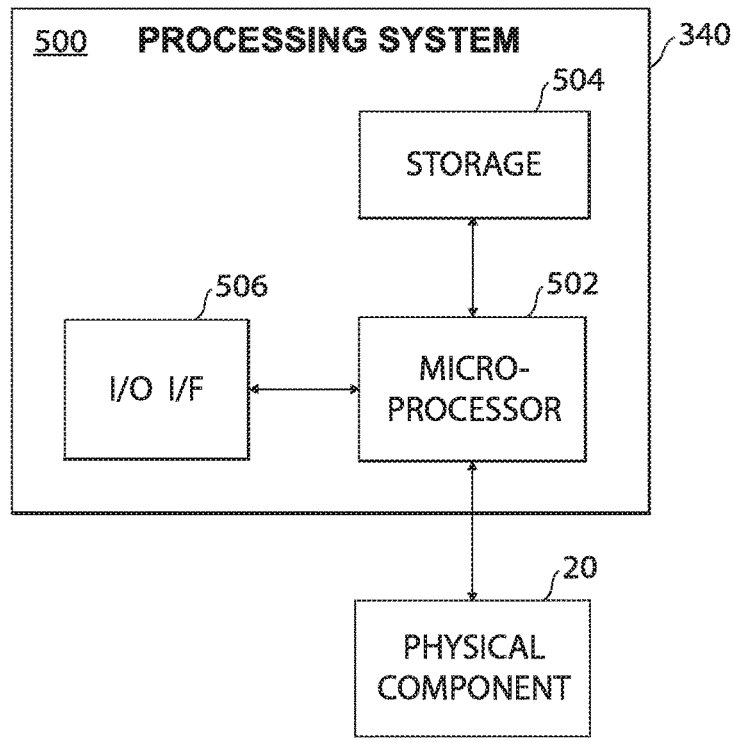
FIG. 5 is a block diagram of an exemplary computer system configured to control the buck DC-DC converter.

With reference to FIG. 5, the controller component 340 shown in FIG. 3 can be configured, for example, as a processing system 500. Processing system 500 is only one example of a suitable system and is not intended to suggest any limitation as to the scope of use or functionality of embodiments of the disclosure described herein. Regardless, processing system 500 is capable of being implemented and/or performing functionality set forth hereinabove.

Processing system 500 is shown in FIG. 5 in the form of a general-purpose computing device. The components of processing system 500 may include, but are not limited to, one or more processors or processing units 502, memory devices 504, and connector(s) or bus 506 that couples various system components including the memory devices 504 to the processing unit 502. The physical component 20 can be included with the processing system 500 and communicate via connector(s) 506 or external to the processing device and communicate with the processing unit via the I/O Interface 508.

The memory devices 504 can include system memory that include system memory having readable media in the form of volatile memory, such as random access memory (RAM) and/or cache memory. Memory devices 504 may further include other removable/non-removable, volatile/non-volatile computer system storage media, such as for storing program data (e.g., frequency values) and/or software modules having programmable instructions that are configured to carry out certain functions of embodiments of the disclosure.

Processing system 500 may also include an Input/Output (I/O) interface 508 or connector for communicating with one or more external devices 510, a keyboard, a pointing device, a display, and/or another computing device.

In some embodiments, output communication to the user can be performed via a communications bus. In an exemplary embodiment, output communication to the user can be performed via a communications bus.

A potential advantage of the various embodiments of the converter 300 disclosed is the ability to decouple disturbances at the load 34 from the input voltage 22 of the high voltage DC link, and/or decouple disturbances at the input voltage 22 of the high voltage DC link from the output voltage $V_{out}$ at the load, which improves power quality. The decoupling increases the overall dynamic stiffness ($i_{Load}/V_{out}$) without increasing gains of the outer voltage loop described. ]Since the load current $I_{Load}$ is measured through the second sense device 304, the load current disturbance is summed into the second summation point 350 to decouple the load current disturbance. Similarly, the input voltage $V_{in}$ 22, $V_{in}$ is measured by voltage sense circuit 302 and fed into peak calculation module 362 to decouple the input voltage disturbance. The increase of dynamic stiffness across a wide range of frequencies is attainable in particular due to the ability to measure $i_{LOAD}$ by the current sense device 304, control the PWM 54 using $i_{LOAD}$, measure the input voltage $V_{in}$ by the voltage sense device 302, control the PWM 54 using the measured input voltage $V_{in}$ and perform operations performed on $i_{LB\_PK\_CMD}$ by the pole-zero cancellation module 364 to cancel the zero of the physical component 20.

While shown and described in the exemplary context of aircraft engine related applications, those skilled in the art will readily appreciate that the converter 300 in accordance with this disclosure can be used in any other suitable application, including connecting peripherals to a smartphone using a universal serial bus (USB), a point-of-load converter capable of efficiently driving power to high current loads, battery chargers, solar chargers, a power stage of Class D power audio amplifiers, pure sine wave power inverters that produce a sinewave from a DC voltage source (e.g., battery), a brushless motor driver (such as used by quadcopter) or purposes other than aircraft engines.

While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A buck DC-DC power converter comprising:
   at least one switch connected to a DC link;
   a buck inductor coupled to the switch that is configured to operate on current flowing from the DC link through the switch when the switch is turned ON; and
   an output capacitor that is configured to be charged by the buck inductor, wherein the buck inductor is coupled between the DC link and the output capacitor and the output capacitor is coupled in parallel with a load; and
   a controller having:
   a pulse width modulator (PWM) configured to be controlled by a control signal to control the at least one switch, the control signal being based on both a measured load current and a measured DC link input voltage, wherein the measured load current is a measurement of current that flows from the buck inductor and the measured input voltage is a measurement of the DC link input voltage measured across the DC link.

2. The converter of claim 1, wherein the controller further comprises a peak calculation module that is configured to receive the measured input voltage and a measured output voltage that is measured across the output capacitor, the peak calculation module being configured to calculate a peak current based on the measured input voltage, the measured output voltage, inductance of the buck inductor, and a switching frequency of the at least one switch.

3. The converter of claim 2, wherein the controller further comprises:
   a first summation module that is configured to receive a command voltage and determine a voltage difference between the command voltage and the measured output voltage; and
   a second summation module that is configured to receive at least one of an integrated and proportional current of the voltage difference and output an average current which is an average of the at least one of an integrated and proportional current and the measured load current.

4. The converter of claim 3, wherein the controller further comprises a third summation module that is configured to sum the average current and the peak current.

5. The converter of claim 4, wherein the controller further comprises a pole-zero cancellation module that is configured to receive output of the third summation module and output a corresponding system pole to cancel a physical component zero created by ESR resistance associated with the output capacitor.

6. The converter of claim 5, wherein the controller further comprises a comparator that is configured to compare a measured current that flows through the switch when the switch is enabled and the pole-zero output and output the control signal.

7. The converter of claim 1, further comprising a current sensing circuit that is configured to measure the measured load current.

8. The converter of claim 1, further comprising a voltage sensing circuit that is configured to measure the measured input voltage.

9. A controller of a buck DC-DC power converter, the controller comprising:
   a pulse width modulator (PWM) configured to be controlled by a control signal to control at least one switch that is coupled to a buck inductor to allow the buck inductor to operate on a current flowing from a DC link only when the at least one switch is turned ON, the control signal being based on both a measured load current and a measured input voltage, wherein the measured load current is a measurement of current that flows from the buck inductor and the measured input voltage is a measurement of a DC link input voltage measured across the DC link.

10. The controller of claim 9, wherein the controller further comprises a peak calculation module that is configured to receive the measured input voltage and a measured output voltage that is measured across an output capacitor charged by the buck inductor, the peak calculation module being configured to calculate a peak current based on the measured input voltage, the measured output voltage, inductance of the buck inductor, and a switching frequency of the at least one switch.

11. The controller of claim 10, wherein the controller further comprises:
   a first summation module that is configured to receive a command voltage and determine a voltage difference between the command voltage and the measured output voltage; and a second summation module that is configured to receive at least one of an integrated and proportional current of the voltage difference and output an average current which is an average of the at least one of an integrated and proportional current and the measured load current.

12. The controller of claim 11, wherein the controller further comprises a third summation point module that is configured to sum the average current and the peak current.

13. The controller of claim 12, wherein the controller further comprises a pole-zero cancellation module that is configured to receive output of the third summation module and output a corresponding system pole to cancel a physical component zero created by ESR resistance associated with the output capacitor.

14. The controller of claim 13, wherein the controller further comprises a comparator that is configured to compare a measured current that flows through the switch when the switch is enabled and the pole-zero output and output the control signal.

15. A method of controlling a buck DC-DC power converter, the method comprising:
  generating a control signal to control a pulse width modulator (PWM), wherein the control signal is based on both a measured load current and a measured input voltage, wherein the measured load current is a measurement of current that flows from a buck inductor of the buck DC-DC power converter and the measured input voltage is a measurement of a DC link input voltage measured across a DC link of the buck DC-DC power converter; and
  controlling by the PWM at least one switch that is coupled to the buck inductor to allow the buck inductor to operate on a current flowing from the DC link only when the at least one switch is turned ON.

16. The method of claim 15, further comprising:
  receiving a measured output voltage that is measured across an output capacitor that is charged by the buck inductor; and
  calculating a peak current based on the measured input voltage, the measured output voltage, inductance of the buck inductor, and a switching frequency of the at least one switch.

17. The method of claim 16, further comprising:
  receiving a command voltage;
  determining a voltage difference between the command voltage and the measured output voltage;
  determining at least one of an integrated and proportional current of the voltage difference; and
  determining an average current which is an average of the at least one of an integrated and proportional current and the measured load current.

18. The method of claim 17, further comprising summing the average current and the peak current.

19. The method of claim 18, further comprising:
  operating on output of the summation to determine a corresponding system pole;
  cancelling a physical component zero created by ESR resistance associated with the output capacitor;
  comparing a measured current that flows through the switch when the switch is enabled and the pole-zero output; and
  outputting the control signal based on a result of the comparison.

20. The method of claim 19, further comprising measuring at least one of the measured load current and the measured input voltage.

* * * * *